United States Patent [19]

Kuhlmann

[11] 3,963,051

[45] June 15, 1976

[54] SYSTEM FOR THE REMOTE CONTROL OF THE JACK CYLINDERS OF A HYDRAULICALLY OPERATED CRANE

[75] Inventor: Hans-Jochen Kuhlmann, Bremen, Germany

[73] Assignee: Kuhlmann & Rust KG, Maschinenfabrik, Bremen, Germany

[22] Filed: Aug. 16, 1974

[21] Appl. No.: 498,126

[30] Foreign Application Priority Data

Aug. 31, 1973 Germany............................ 2343887

[52] U.S. Cl................................... 137/637; 251/89; 251/131; 318/663; 318/674

[51] Int. Cl.².......................................... F16K 31/42

[58] Field of Search........................ 137/637, 637.1; 251/131, 279; 318/663, 674

[56] References Cited

UNITED STATES PATENTS

| | | | |
|---|---|---|---|
| 2,112,218 | 3/1938 | Gille | 318/663 |
| 2,486,591 | 11/1949 | Ferrante | 200/157 |
| 2,684,459 | 7/1954 | Brown et al. | 318/674 X |
| 3,559,817 | 2/1971 | Brown | 91/453 X |

*Primary Examiner*—Martin P. Schwadron
*Assistant Examiner*—Richard Gerard

[57] ABSTRACT

A remote control system for the jack cylinders of a hydraulically operated crane includes a plurality of regulating valves for controlling respective jack cylinders, the regulation of each valve being controlled by the movement of a respective valve spool connected to a respective lever forming part of a linkage including an arm mounted on a rotatable shaft and connectable to the shaft by a respective electromagnetically operated clutch so that by engagement of one said clutch and rotation of the shaft to a predetermined position the corresponding valve spool may be correspondingly positioned to move the associated jack cylinder accordingly.

Engagement of the clutches and rotation of the shaft can be controlled by a portable actuating unit connected to the rest of the system by an electrical cable, the system including a control means which adjusts the position of the shaft to correspond with the setting of a control member on the actuating unit.

6 Claims, 5 Drawing Figures

SYSTEM FOR THE REMOTE CONTROL OF THE JACK CYLINDERS OF A HYDRAULICALLY OPERATED CRANE

BACKGROUND OF THE INVENTION

The invention relates to a system for the remote control of one or more jack cylinders of a hydraulically operated crane.

The jack cylinders which are associated with a hydraulically operated crane, more particularly a mobile crane, are adapted to effect hoisting, lowering, slewing, and where appropriate derricking of the jib or extension and retraction of a telescopic section of the jib. In such cranes it is advantageous if the jack cylinders can be actuated alternatively from the drivers seat or from the region of the crane base, operation from the latter region having the advantage that the operator has an adequate view of any given situation which is not normally the case in the drivers seat.

Furthermore, it is desirable, more particularly in the case of mobile cranes, to enable the jack cylinders to be remotely controlled from a position which is at a substantial distance from the crane base. Remote control of this kind becomes necessary more particualrly if the crane is to be operated by a single person.

A system for remotely controlling the jack cylinders of a hydraulic crane is known in which regulating valves have valve members, constructed as spools, which are regulated by regulating means which comprise auxiliary hydraulic cylinders. Each of the said auxiliary cylinders is biased by a separate valve the spool of which must be operated via a magnet. The entire actuating means for the regulating means of the main valves which are connected to the jack cylinders comprises a body-worn harness device which is connected to the main valves by means of hydraulic connecting ducts for remote control. Direct actuation of the actuating means is performed by means of hand levers.

The known system suffers from the disadvantage that the small hydraulic spools must be manually operated by corresponding levers against a substantial pressure in cases in which no remote control is applied. A further disadvantage of the known system is due to the fact that the operator is substantially obstructed by the body-worn harness device. This is because the said harness device is not only relatively heavy but is also connected to the crane by the hydraulic connection which comprises the connecting ducts and is therefore relatively stiff so that the mobility of the operator is noticeably restricted. A further very important disadvantage of the known system is due to the fact that the subsequent installation thereof as a simple extension of an existing hydraulic system is not possible. Instead it is necessary for practically the entire hydraulic control system to be exchanged a procedure which is exceptionally expensive, not least because of the long installation time required to this end.

SUMMARY OF THE INVENTION

It is the object of the invention to provide an improved system for the remote control of the jack cylinders of a hydraulically operated crane, which can be readily connected in the manner of a supplementary unit to the hydraulic system of an existing crane in the shortest possible time, the system including a remote actuating unit presenting little encumbrance to the operator.

According to the invention there is provided a system for the romote control of a jack cylinder of a hydraulically operated crane, comprising a regulating valve adapted for connection into the hydraulic circuit of such a jack cylinder, the regulating valve having a body part and a member movable with respect to said body part to control the regulation of the valve, the system including a shaft rotatable in a member fixed with respect to the body part of the valve, and means whereby said shaft can be coupled to said movable member of the valve so that the position of the movable member of the valve depends on the angular position of said shaft, a measured value transducer coupled to said shaft for sensing the angular position of the latter, reversible driving means for rotating said shaft, an adjustable set point value transducer, and control means operable to energise said reversible driving means to rotate said shaft to a position corresponding to the valve set on said set point value transducer, said control means including a portable actuating unit incorporating said set point transducer and connected to the remainder of the system by a flexible lead.

In a preferred embodiment the shaft can be selectively coupled to any one of a plurality of movable valve members of a corresponding number of valves each controlling a respective one of a corresponding number of jack cylinders of the crane.

A preferred embodiment of the invention is described with reference to the accompanying drawings.

DESCRIPTION OF THE PREFERRED EMBODIMENT

Figure 2:
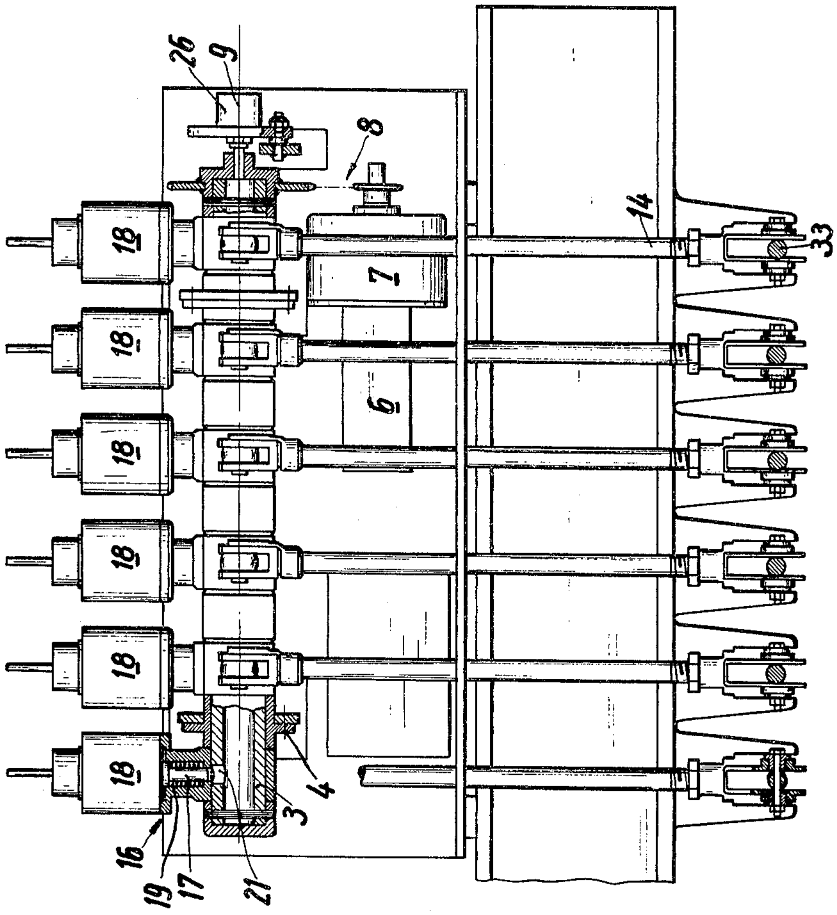
FIG. 2 is a front view, partly in section, of the device according to FIG. 1 viewed in the direction of the arrow II in FIG. 1.
Figure 1:
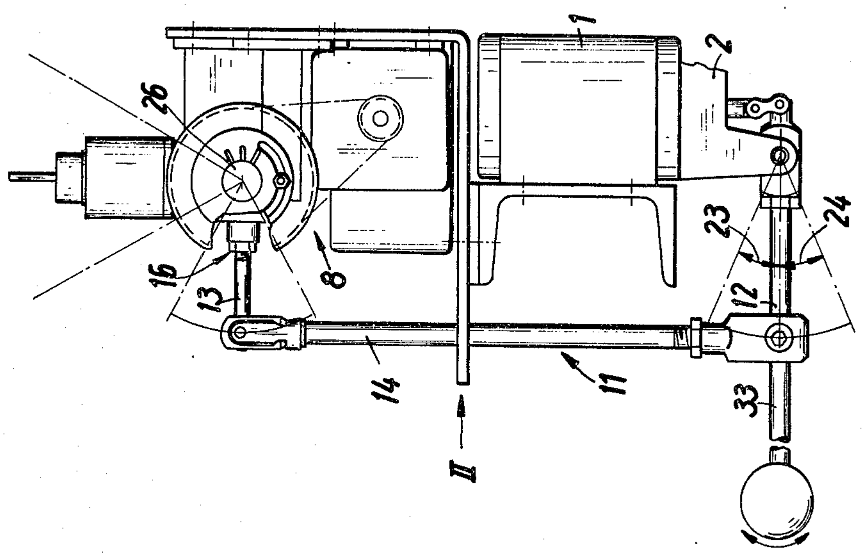
FIG. 1 is a side view of part of a system according to the invention which part is fixedly installed on a hydraulically actuated mobile crane.

The part of the system shown in FIGS. 1 and 2 includes six regulating or control valves each connected in respective hydraulic circuit controlling a respective jack cylinder, not shown, of a hydraulically actuated mobile crane (not shown). The part shown in FIGS. 1 and 2 is mounted on the crane itself. Each valve 1 includes a fixed body part and a valve spool 2, movable longitudinally (i.e. vertically in FIGS. 1 and 2) with respect to the valve body part. Each valve 1 is arranged to control the respective jack cylinder, e.g. by maintaining the rate of supply of fluid to or removal of fluid from the jack cylinder at a value dependant on the position of the spool 2 in the valve body part, or by maintaining the degree of extension or retraction of the jack cylinder at a value dependant on the last mentioned position. The body parts of the valves 1 are fixed to a girder on which is mounted a frame carrying bearings 4 rotatably supporting a hollow shaft 3. The shaft 3 is rotatable about its longitudinal axis 9 by driving means comprising a reversible d.c. motor 6, gearing 7 and a chain transmission 8.

The position of each spool 2 in its valve body is adjustable by a respective two-armed lever 33 pivotally connected to the respective valve body for pivoting about an axis parallel with the axis 9, each said lever having a short arm, pivotally connected via a short intermediate link with the end of the respective spool 2, and a much longer arm 12 having an operating knob at its free end. Each spool 2 can be coupled to the shaft 3 by a respective coupling linkage 11 which includes the respective arm 12, a respective connecting rod 14 pivotally connected at its lower end to the arm 12 and pivotally connected at its upper end to the outer end of an arm 13, the inner end of the arm 13 being formed as a sleeve rotatable on the shaft 3, the sleeve forming part of a respective clutch 16 by means of which the arm 13 can be fixed to the shaft 3 to rotate therewith or can alternatively be disengaged from the shaft 3 so that the shaft can rotate freely within the sleeve. Bias means, not shown, acting within the valve, or on the arm 12 or 13, ensure that when a clutch 16 is disengaged and no external force is applied to the respective linkage 11, the latter adopts the position shown in FIG. 1 with the arms 12 and 13 extending horizontally parallel with each other and the connecting rod 14 extending vertically.

Each clutch 16 includes a housing mounted on the sleeve of the arm 13 and in which a clutch bolt 17 is slidable radially with respect to the shaft 3 between a projected position and a retracted position. The bolt 17 is urged into its retracted position by a spring 19 and is movable, against the bias of the spring into its projected position by an electromagnet 18, when the latter is energised and when the bolt is in alignment with a respective recess 21, in the form of a radially extending bore, in the shaft 3. In the stand-by state, in which none of the clutches 16 is engaged the shaft 3 adopts a predetermined angular position in which, with the linkages 11 in the position shown in FIG. 1, each bolt 17 is in alignment with its respective bore 21. When an electromagnet 18 is energised, the respective bolt 17 is projected, against the force exerted by its spring 19, into the respective bore 21, whereby the respective clutch 16 is engaged. Energising of the clutches 16 is controlled by an actuating unit 22 which will be described later with reference to FIGS. 3 and 4.

It will be appreciated from the description above that the shaft 3 can be optionally coupled to any clutch 16 and can therefore be optionally indirectly coupled to any valve slide 2.

Thus any valve spool 2 can be adjusted by engaging the respective clutch 16 and rotating the shaft 3 so that the respective linkage 11 is pivoted for example through an angle 23 in the upward direction or through an angle 24 in the downward direction from the stand-by position (see FIG. 1), depending on the sense in which the shaft 3 is rotated, moving the appropriate valve spool 2 downwards or upwards respectively.

The motor 6, and thus the rotation of the shaft 3 is controlled by control means which operates in such a way as to move the shaft to an angular position set manually. To this end, one end of the shaft is coupled to a potentiometer 26 which forms a measured value transducer providing a signal corresponding to the angular position of the shaft. The manually set angular position is determined by an adjustable set value transducer, which may for example be another potentiometer 36 and which provides a signal corresponding to the desired angular position of the shaft. The control means is arranged to energise the motor 6 for rotation in one or the other direction if there is a difference between the desired angular position set on the set value transducer 36 and the actual position as indicated by the measured value transducer 26, so as to reduce and eliminate this difference. The control system, however, operates in this way only if one of the clutches 16 is engaged.

Figure 5:
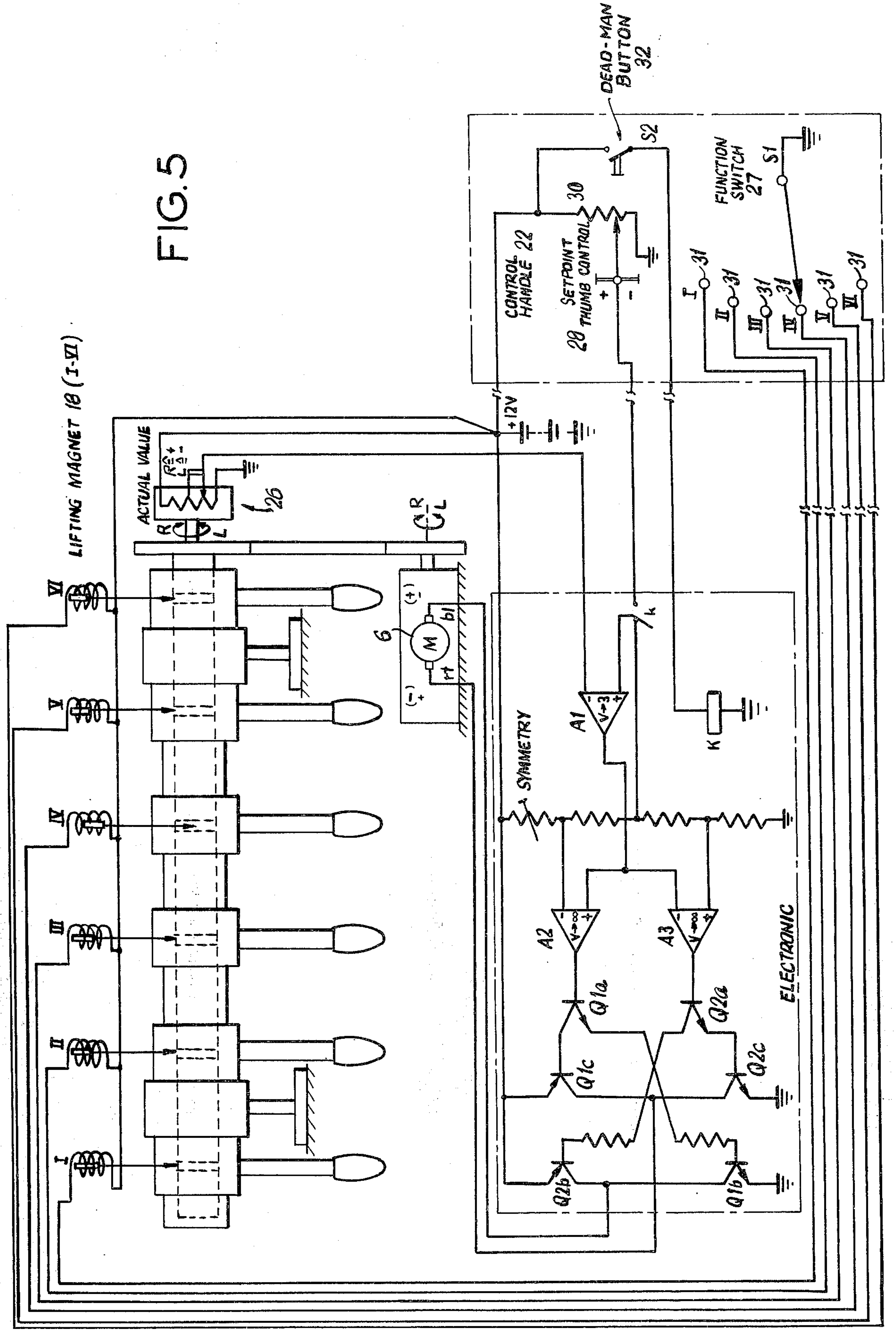
FIG. 5 is a diagrammatic representation of the electrical circuit of the actuating unit and the valves.

The control system as shown in great detail in FIG. 5 showing the electrical circuit interconnecting the potentiometer 26, motor 6, set point control member 28, dead-man button 32, function-switch 27 and electronic circuitry comprising an amplifier A1, two comparators A2 and A3 and the transistors Q1a, Q1b, Q1c and Q2a, Q2b and Q2c.

Figure 3:
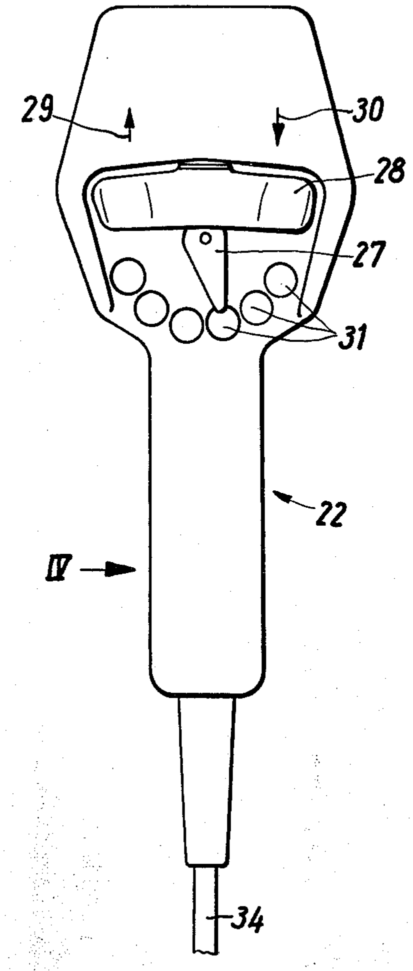
FIG. 3 is a front view of an actuating unit adapted to be held in one hand, viewed in the direction of the arrow III in FIG. 4.
Figure 4:
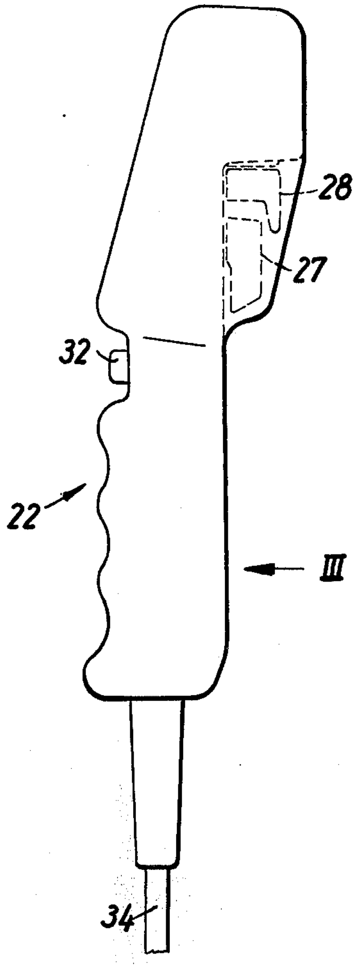
FIG. 4 is a side view of the actuating unit according to FIG. 3 as seen in the direction of the arrow IV in FIG. 3.

FIGS. 3 and 4 show the portable actuating unit 22 which is constructed as a unit intended to be held comfortably in one hand. The actuating unit 22 is provided with an electric multi-way switch, operable by a knob 27 having a pointer which can be set to any one of six reference marks 31, each corresponding to one of the clutches 16. When the knob is set to a reference mark 31, the corresponding electromagnet 8 is energised, provided that other conditions are also met, as will appear below. A second control member 28, constructed as a bridge switch, is also provided for adjusting the set point transducer to the set point value which defines the traversing travel of the appropriate valve spool 2, tilting the member 28 downwards on the side adjacent the arrow 29 resulting in rotation of the shaft 3 in the anti-clockwise direction as a result of which the respective jack cylinder is extended and tilting of the member 28 downwards on the side adjacent the arrow 30 causing the shaft 3 to rotate in the clockwise direction as a result of which the respective jack cylinder is retracted.

The construction of the switch operated by knob 27 ensures that in each position of the knob 27 a specific electromagnet 18 is energised and that electrical connection of the other electromagnets 18 is reliably interrupted to ensure that at any time only one jack cylinder of the crane is operated.

The actuating unit 22 is finally provided with a button 32 of a switch which is constructed in the manner of a dead-man's switch the switch being constantly biased into its open position so that unless the button is held continuously in a depressed condition to close the switch the member 28 is ineffective to control any of the jack cylinders. If the button 32 is released the control system operates to return the shaft 3 automatically to its stand-by position which is shown in solid lines in FIG. 2, and to disengage all of the clutches.

With the actuating unit inoperative, and thus with all of the clutches 16 disengaged, each valve spool 2 associated with a respective jack cylinder can be actuated by operation of the respective lever 33, part of which provides the respective arm 12.

However, if a jack cylinder is to be operated by means of the remote control system the electric connection to the electromagnet 18 is established by means of the switch knob 27 so that the said electromagnet is energised and inserts the clutch bolt 17 associated therewith against the force exerted by the spring 19 into the appropriate recess 21 of the shaft 3. The appropriate clutch 16 is thus positively coupled to the shaft 3. The shaft 3 can then be set into anti-clockwise or clockwise rotation through the drive 6, 7, and 8 by means of the member 28, rotation being continued until the set point defined by the member 28 coincides with the measured value indicated by the potentiometer 26. The shaft 3 stops in this position. It will then have pivoted the linkage 11 either through an angle, for example angle 23 or 24, which corresponds to a specific travel of the valve spool 2 of the associated valve 1 which in turn defines the operating speed or position of the associated jack cylinder. The button 32 must always be actuated while the actuating unit 22 is in operation. If the deadman's switch is released the shaft will automatically return into its starting position, a process which takes place in the engaged as well as in the disengaged state.

All valves 1 — in the present case six valves — and therefore the jack cylinders associated with the valves 1 can thus be successively actuated.

One particular advantage of the system described is that it can be readily connected in the shortest possible time to existing hydraulic cranes without the need for exchanging the hydraulic system. It is also an advantage that in practice the operator is not encumbered either by the actuating unit which is constructed as a small unit which can be held in one hand or by the connecting lead 34 which is an electrical cable and is exceptionally thin and flexible and extends from the actuating unit to the remainder of the system mounted on the crane. Furthermore, when the actuating unit 22 is not in use the jack cylinders can be controlled from the crane by means of the levers 33 which can be operated with very little effort.

I claim:

1. A system for the remote control of a jack cylinder of a hydraulically operated crane, comprising a regulating valve for connection into the hydraulic circuit of the jack cylinder, said regulating valve including a body part and a movable member, means mounting said movable member in said body part for movement for controlling the regulation of the valve, the system further including a member fixed with respect to said body part of the valve, a shaft, means mounting said shaft for rotation in said fixed member, coupling means for coupling said shaft to said movable member for rendering the position of the movable member of the valve dependent on the angular position of said shaft, said coupling means including a linkage including a first arm having first and second ends, means for releasably coupling said first end of said first arm to said shaft, a connecting link having first and second ends, means pivotally connecting said first end of said connecting link with said second end of said first arm, a second arm generally parallel with said first arm, means mounting said second arm for pivoting about an axis fixed with respect to said fixed member, means pivotally connecting said second end of said connecting link with said second arm, and means connecting said movable valve member with said second arm, a measured value transducer coupled to said shaft for sensing the angular position of the shaft, reversible driving means for rotating said shaft, control means including a portable actuating unit, an adjustable set value transducer carried by said actuating unit, a flexible lead connecting said actuating unit with the remainder of said system, and means in said control means operable to energize said driving means in the event of a difference between the position of said shaft indicated by said measured value transducer and the desired position set on said set value transducer to rotate said shaft so as to eliminate said difference.

2. The system of claim 1 wherein said coupling means comprises a respective clutch for coupling said first end of said first arm releasably with said shaft.

3. The system of claim 2 wherein said clutch is electrically operable.

4. The system of claim 3 wherein said clutch includes a sleeve at said first end of said first arm, accommodating said shaft, a member fixed with respect to said sleeve, a clutch bolt, means mounting said clutch bolt in said member for movement transverse to the axis of said shaft, spring bias means biasing said bolt into a retracted position withdrawn from the shaft, an electromagnet energisable to move said bolt against said spring bias means into a projected position, and a recess extending transversely into the shaft to receive the bolt in its said projected position.

5. The system of claim 4 including a plurality of such regulating valves and respective said linkages, clutches and electromagnets for said valves whereby any one said linkage can be selectively coupled to said shaft by its respective clutch, and wherein said actuating unit is a unit which can be held in one hand and includes a manually operable multi-way switch operable by a knob to energise a selected one of said electromagnets, and a further manually operable control member for adjustment of the set point of the said set value transducer.

6. A system for the remote control of a plurality of jack cylinders of a hydraulically operated crane, comprising a plurality of regulating valves for connection into the hydraulic circuit of the respective jack cylinder, each said regulating valve including a body part and a movable member, means mounting each said movable member in said respective body part for movement for controlling the regulation of the respective valve, said system further including a member fixed with respect to said body parts of said valves, a shaft, means mounting said shaft for rotation in said fixed member, coupling means for coupling said shaft to any selected one of said movable members for rendering the position of the respective movable member of the respective valve dependent on the angular position of said shaft, a measured value transducer coupled to said shaft for sensing the angular position of the shaft, reversible driving means for rotating said shaft, control means including a portable actuating unit, an adjustable set value transducer carried by said actuating unit, a flexible lead connecting said actuating unit with the remainder of said system, and means in said control means operable to energize said driving means in the event of a difference between the position of said shaft indicated by said measured value transducer and the desired position set on said set value transducer to rotate said shaft so as to eliminate said difference.

* * * * *